Aug. 8, 1939.   V. NICOLET ET AL   2,168,845
VEHICLE BRAKE
Filed Jan. 6, 1938
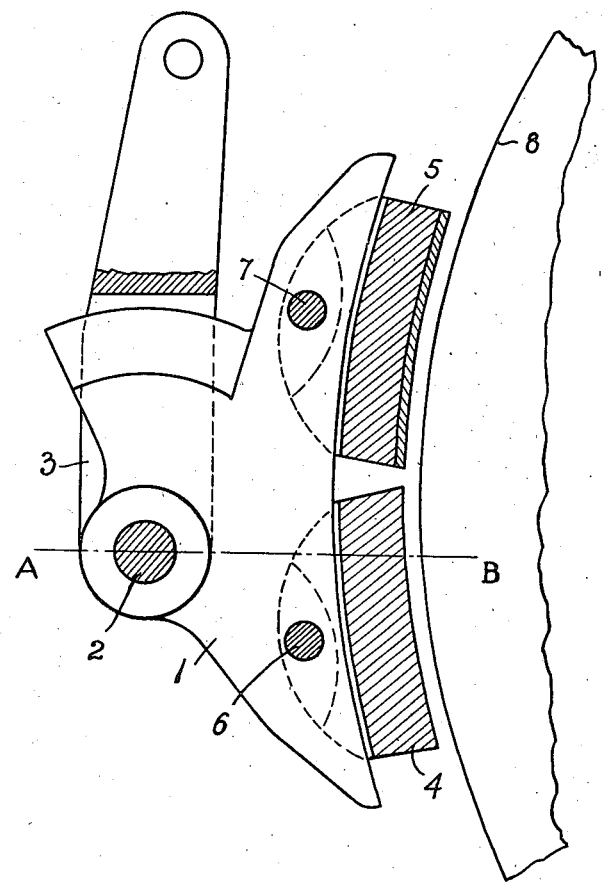
INVENTORS.
V. NICOLET
R. ROUSSELET.
By Blair + Kilcoyne
ATTYS.

Patented Aug. 8, 1939

2,168,845

UNITED STATES PATENT OFFICE 2,168,845

VEHICLE BRAKE

Victor Nicolet and Robert Rousselet, Paris, France

Application January 6, 1938, Serial No. 183,717
In France January 13, 1937

3 Claims. (Cl. 188—33)

The present invention relates to a braking device for vehicles, particularly for railway vehicles, though not limited to this particular application.

In order that a vehicle brake should never cause skidding due to locking of the wheels it is necessary to obtain at all times the condition $$Qf \leq P\varphi$$

where P is the weight of the braked vehicle, Q the braking force by which the brake shoes or blocks are applied to the wheels, $f$ the coefficient of friction between the frictional surfaces, and $\varphi$ the coefficient of adhesion of the wheel or the axle.

The efficacy of such a brake will thus be limited by these conditions, and it will be a maximum if at any time during the braking process the braking force Q is adjusted to a value $$Q = \frac{P\varphi}{f} - \epsilon$$

$\epsilon$ being as small as possible.

However, the factors $\varphi$ and $f$ vary with the speed of the vehicle in conformity with formulae which differ according to the nature of the brake-shoes or like parts, and also according to the wheel tires and the rolling surfaces, and, as a rule, it is practically impossible to make the shoes, or their active surfaces, of a material such that the ratio $$\frac{\varphi}{f}$$

will be independent of the speed. In the case of a railway vehicle with cast iron shoes in frictional contact with steel tires, $\varphi$ and $f$ both increase when the speed is reduced during the braking action, but $\varphi$ increases less rapidly than $f$, so that the said ratio diminishes with the speed, and, in order always to obtain an optimum braking effect, it would be necessary to decrease the braking force Q when slowing down. On the contrary, if use is made of shoes whose active surface consists of asbestos material in frictional contact with the steel of the tires, the coefficient $f$ will be practically independent of the speed, and thus the ratio $$\frac{\varphi}{f}$$

will increase when the speed diminishes, and it would be necessary in achieving the same end to increase the braking force when slowing down.

In practice, the braking force is given a constant value which is less than the lower limit of $$\frac{P\varphi}{f}$$

in order that theoretically there shall only be a tendency for skidding to take place when stopping, or alternatively at a speed greater than the maximum speed of the vehicle to be braked, depending on the direction of the variation of $$\frac{\varphi}{f}$$

with the speed, but in either case the optimum braking effect is not constantly obtained over the whole speed range.

The invention has for its object to obviate this serious drawback, and it consists in employing upon a given vehicle frictional surfaces consisting of different materials for which the ratio $$\frac{\varphi}{f}$$

varies in opposite directions with the speed, and thus by properly combining these frictional surfaces making possible a combined or resultant ratio $$\frac{\varphi}{f}$$

which is practically constant over the required speed range. The braking force Q can then be fixed at a constant value which is quite near its upper safety limit $$\frac{P\varphi}{f}$$

this latter being itself practically constant since P is a constant. Consequently, in accordance with the principles initially stated the optimum braking effect will always be obtained without the addition of any automatic regulating devices and without the necessity of varying the braking force when slowing down. These different frictional surfaces may be used in the form of shoes or linings of any kind, or of drums or tires, and the materials used may be various so long as they have coefficients of friction which vary with the speed according to different formulae so as to contribute collectively to the desired result.

The accompanying drawing shows by way of example an embodiment of the invention.

In the example herein represented, which shows the application of the invention to a railway vehicle, each of the usual shoes of a vehicle is replaced by a member 1, which is pivoted by means of the pin 2 to the final lever 3 of the brake gear controls, and the said member 1 carries two shoes 4 and 5 which are pivoted by means of the pins 6 and 7 respectively to the member 1. The frictional surfaces of the said shoes, which act upon the tire of the wheel 8, consist of cast iron for the shoe 4 and of an asbestos material for the shoe 5. The ratio of the braking forces acting respectively upon the shoe of cast iron and that of the asbestos material is equal to the inverse ratio of the distances from the respective pivot axes 6—7 to the line of application of the force A—B passing through the axis 2. In the present device, this ratio is about 3:1, that is the shoe 4 is applied to the rim 8 with a force which is three times the force with which the shoe 5 is applied. As has been established by experiments, the permissible coefficient $\varphi$ of adhesion between the wheels and the rails can be assumed as 0.11 at 60 miles per hour and as 0.17 at 10 miles per hour. The coefficient of friction between a brake shoe and the wheel may be assumed for cast iron shoes as $fI=0.11$ at 60 miles per hour and as 0.24 at 10 miles per hour, the corresponding values $fA$ for asbestos shoes being 0.35 and 0.3 respectively.

Thus, with the assumption of the dependency on the speed being substantially linear within the considered limits, we obtain the following formulas for the respective coefficients, $v$ being the speed of travel:

$$\varphi = 0.182\ (1-v/150)$$
$$fI = 0.266\ (1-v/100)$$
$$fA = 0.290\ (1+v/300)$$

If, further, $a$ and $b$ are the fractions of the total force $Q$ exerted on the cast iron and asbestos brake blocks respectively, our fundamental equation $\Sigma Qf = P\varphi(1-\epsilon)$ assumes the following form: $(1-\epsilon)P\varphi = Q(a.fI + b.fA) = F$. If, as required, $(1-\epsilon)$ is independent of the speed $v$, and $F_0$ is the value of $F$ for $v=0$, we can form the following equation:

$$\frac{\varphi - \varphi^\circ}{\varphi^\circ} = \frac{a(fI - fIo) + b(fA - fAo)}{afIo + bfAo}$$

$$\frac{v}{150} = \frac{a \cdot 0.266 \cdot \frac{v}{100} + \phi 0.29 \cdot \frac{v}{300}}{0.266a + 0.29b}$$

$$0.266a + 0.29b = 0.266\frac{150}{100}a - 0.29\frac{150}{300}b$$

$$0.435b = 0.133a$$

$$\frac{a}{b} = 3.27.$$

The proportion 3:1 chosen in the example as illustrated gives a good approximation to this value.

By properly selecting $a:b$, $1-\epsilon$ could be made fully independent of the speed, if, as we assumed, the various coefficients were linear functions of the speed. Actually this is so nearly true that it has been found that at a certain brake cylinder pressure, the skidding limit is only approached when the speed of the vehicle is above 75 miles per hour and when the vehicle is already stopping, in which latter case, of course, no actual skidding will occur.

As the behaviour of the shoes of asbestos material is unfavourably affected by moisture it is advantageous to arrange the cast iron shoes 4 below the shoes of asbestos material 5, in order that these cast iron shoes may destroy the film of water which covers the tire in case of rain.

Having now described our invention, what we claim as new and desire to secure by Letters Patent is:

1. A vehicle brake mechanism, including a wheel, a brake member comprising two brake surfaces of different material, adapted to cooperate with said wheel, the rate of variation in accordance with the speed of the coefficient of friction being more negative for the material of one of the surfaces and less negative for the other surface, than the rate at which the coefficient of adhesion between the wheels and the rolling surface varies in accordance with the speed of the vehicle, force distributing arrangements being further provided for so distributing to the two brake surfaces the total application force that the joint coefficient of friction in respect to the total force of application varies in accordance with the vehicle speed at the same rate as the coefficient of adhesion.

2. Vehicle brake as claimed in claim 1, in which one brake surface of asbestos mass and another brake surface of cast iron are arranged to cooperate with a steel surface the cast iron surface being applied with about three times the force by which the asbestos surface is applied.

3. A vehicle brake mechanism, including a wheel having a steel rim, a brake member having two brake shoes carried thereby and adapted to be applied to said steel rim, one brake shoe comprising a braking surface of asbestos mass and the other brake shoe comprising a braking surface of cast iron, force distributing means for applying the shoe having the cast iron surface with three times the force by which the shoe comprising the asbestos mass surface is applied, the shoe comprising the cast iron surface being placed below the shoe comprising the asbestos surface.

VICTOR NICOLET.
ROBERT ROUSSELET.